April 16, 1929.  V. J. MARTINI  1,709,675
WIRE CUTTER
Filed April 20, 1928
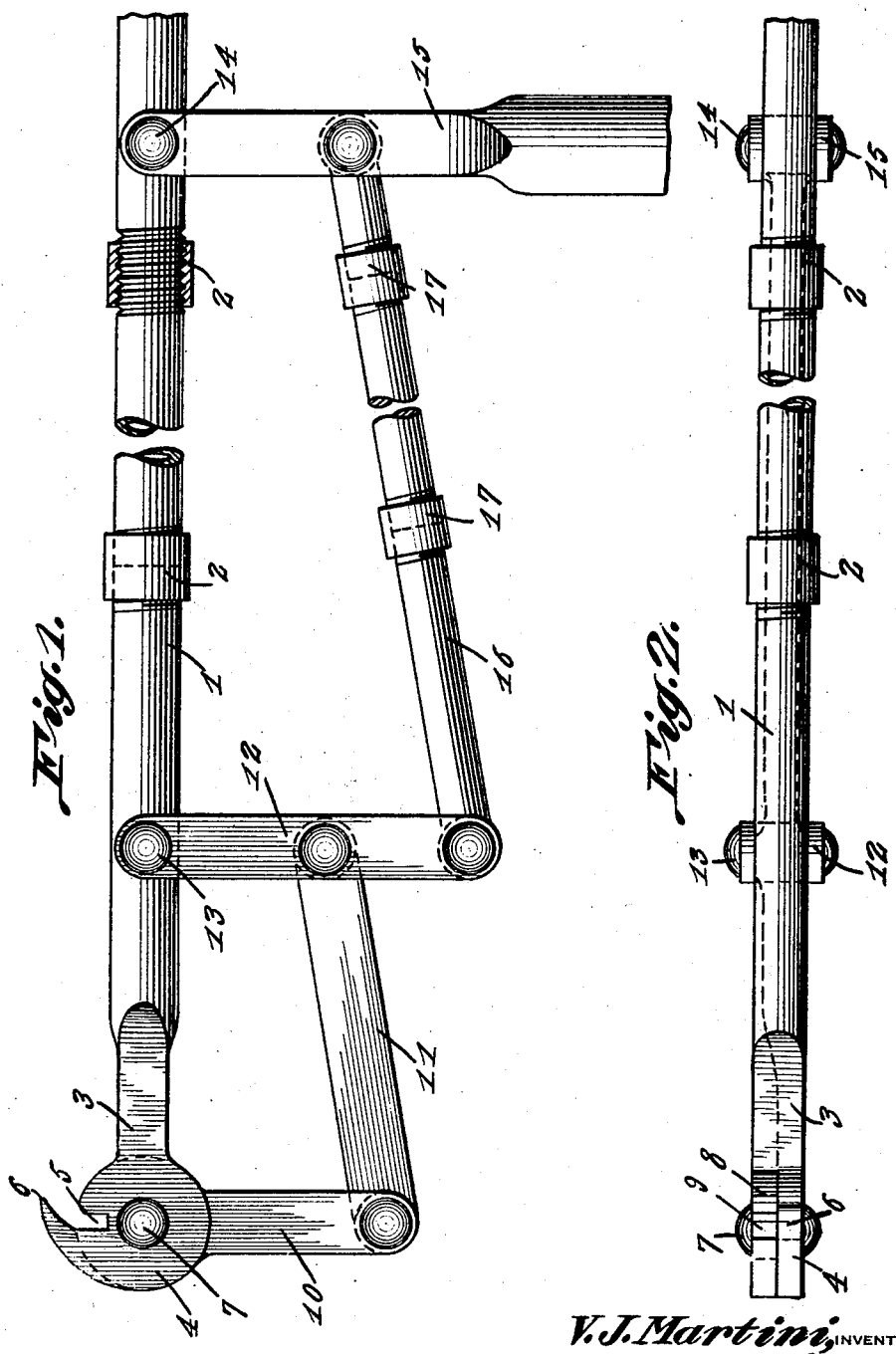
V. J. Martini, INVENTOR
BY Victor J. Evans
ATTORNEY Patented Apr. 16, 1929.

1,709,675

UNITED STATES PATENT OFFICE.

VALENTINE J. MARTINI, OF NIAGARA FALLS, NEW YORK.

WIRE CUTTER.

Application filed April 20, 1928. Serial No. 271,582.

My present invention has reference to a wire cutting device, and my object is the provision of a device for this purpose in which the cutting jaws can be arranged to grip the wire to be severed in places which are inaccessible to ordinary wire cutters and further wherein a powerful leverage is afforded so that the wire may be severed at the minimum amount of physical exertion upon the part of the operator.

To the attainment of the foregoing and many other objects which will present themselves the improvement also resides in certain other novel features of construction, combination and operative association of parts, one satisfactory embodiment of which is disclosed by the accompanying drawings.

In the drawings:

Figure 1 is a side elevation of the improvement.

Figure 2 is a top plan view thereof.

In carrying out my invention I make use of a bar 1. This bar, for a certain portion of its length is of tubular formation and the said tubular part is of sections which have their confronting ends threaded and have screwed thereon couplings 2. By this arrangement it will be seen that the bar may be adjusted longitudinally by adding to or removing certain of the tubular sections therefrom. The ends of the bar are flat, one end, indicated for distinction by the numeral 3, merging into a round head 4 formed with a notch 5 whose edges are preferably sharpened and which head is formed with a rounded extension in the nature of a beak 6 whose inner edge is in a line with the outer wall provided by the notch. This rounded head is pivotally connected, as at 7, to a second round head 8 which is also formed with a notch 9 designed to register with the notch 5, when the head 8 is swung on the pivot 7, to one position.

The head 8 is formed on the end of an arm 10, and this arm is pivotally connected through the medium of a link 11 to the central portion of another link 12 which is pivoted, as at 13, to the bar 1. On the outer or second flat end of the bar 1 there is pivoted, as at 14, a handle member 15. Pivotally secured to the handle member and pivotally secured to the free and outer end of the link 12 there is a presser bar 16. The ends of the bar 16 are flattened, but the central portion thereof is tubular. This central portion is also made up of sections, the confronting ends of which being threaded and having screwed thereon couplings 17, whereby the bar 16 like the bar 1 may be longitudinally adjusted.

The simplicity and advantages of my construction as well as the operation thereof will, it is thought, be perfectly understood and appreciated by those skilled in the art. It will be obvious that a powerful leverage may be obtained by the operator gripping the handle 15 and by swinging the said handle the jaw 8 will be turned on the pivot 7 so that a wire received between the registering notches 5 and 9 of the respective jaws will be quickly and effectively severed. It will be further apparent that the beak 6 will direct the wire into the notches and also that the improvement may be employed for severing wires which are located in places inaccessible to ordinary wire cutters.

Obviously I do not wish to be restricted to the precise details herein set forth and, therefore, hold myself entitled to make such changes therefrom as fairly fall within the scope of the appended claim.

Having described the invention, I claim:

In a wire cutter, a bar made up of removably connected sections, and having one of its ends merging into a round head which is notched and formed with a beak extension in a line with one of the walls provided by the notch, a second round head which is also notched and which is pivoted to the first mentioned head and an arm extending from the last mentioned head, a link pivoted to the bar, a second and angularly disposed link pivoted approximately centrally to the first mentioned link and to the end of the arm, an angularly disposed presser bar pivoted to the outer end of the link, said presser bar being made up of removably connected sections and a handle member pivotally secured to the first mentioned bar and to the end of the presser bar.

VALENTINE J. MARTINI.